(12) United States Patent
Hu et al.

(10) Patent No.: US 11,196,241 B2
(45) Date of Patent: Dec. 7, 2021

(54) INTEGRATED OPPOSITE HOOK WIRE CLAMP

(71) Applicant: GUANGZHOU PANYU CABLE GROUP CO., LTD., Guangdong (CN)

(72) Inventors: Chaoqiang Hu, Guangdong (CN); Zhanshan You, Guangdong (CN); Jianji Sun, Guangdong (CN); Dan Qin, Guangdong (CN); Xueer Chen, Guangdong (CN); Guangye Lu, Guangdong (CN); Kaituo Zhang, Guangdong (CN); Yanfa Wang, Guangdong (CN); Shihuan Zhang, Guangdong (CN); Yan Hao, Guangdong (CN); Yuanpeng Shao, Guangdong (CN); Xueli Cheng, Guangdong (CN)

(73) Assignee: GUANGZHOU PANYU CABLE GROUP CO., LTD., Guangdong (CN)

( * ) Notice: Subject to any disclaimer, the term of this patent is extended or adjusted under 35 U.S.C. 154(b) by 190 days.

(21) Appl. No.: 16/487,838

(22) PCT Filed: Jan. 9, 2018

(86) PCT No.: PCT/CN2018/071841
§ 371 (c)(1),
(2) Date: Aug. 22, 2019

(87) PCT Pub. No.: WO2018/153172
PCT Pub. Date: Aug. 30, 2018

(65) Prior Publication Data
US 2020/0044430 A1    Feb. 6, 2020

(30) Foreign Application Priority Data
Feb. 23, 2017 (CN) .......................... 201710100340.5

(51) Int. Cl.
H02G 7/05        (2006.01)
H01R 11/15       (2006.01)

(52) U.S. Cl.
CPC ............. *H02G 7/053* (2013.01); *H01R 11/15* (2013.01)

(58) Field of Classification Search
CPC ........... H02G 7/053; H02G 1/04; H01R 11/15
See application file for complete search history.

(56) References Cited

FOREIGN PATENT DOCUMENTS

| CN | 103401083 | 11/2013 |
| CN | 103401083 A * | 11/2013 |

(Continued)

OTHER PUBLICATIONS

"International Search Report (Form PCT/ISA/210) of PCT/CN2018/071841," dated Mar. 28, 2018, with English translation thereof, pp. 1-4.

*Primary Examiner* — Eret C McNichols
*Assistant Examiner* — Ding Y Tan
(74) *Attorney, Agent, or Firm* — JCIP Global Inc.

(57) ABSTRACT

An integrated opposite hook cable clamp includes a clamping plate, a connecting plate, and at least two J-shaped clamps. Side bars of the J-shaped clamps are locking bars. Locking holes corresponding to the locking bars are provided on the clamping plate, and at least two of the locking holes are diagonally arranged on the clamping plate. The locking bars of the J-shaped clamps vertically pass through the locking holes on the clamping plate and are movably connected with the clamping plate by a locking mechanism. A back surface of the connecting plate is lap-jointed to the inner sides of hooks of each of the J-shaped clamps. A front surface of the connecting plate is opposite to a front surface of the clamping plate (22).

15 Claims, 7 Drawing Sheets

(56) References Cited

FOREIGN PATENT DOCUMENTS

| | | | |
|---|---|---|---|
| CN | 205377195 | | 7/2016 |
| CN | 205377195 U | * | 7/2016 |
| CN | 105826883 A | * | 8/2016 |
| CN | 106300195 | | 1/2017 |
| CN | 106300195 A | * | 1/2017 |
| CN | 106300217 | | 1/2017 |
| CN | 106374410 A | * | 2/2017 |
| CN | 106602493 A | * | 4/2017 |
| CN | 106848970 | | 6/2017 |
| CN | 206533106 | | 9/2017 |
| KR | 20110001300 | | 2/2011 |
| KR | 101390118 B1 | * | 4/2014 |

* cited by examiner

INTEGRATED OPPOSITE HOOK WIRE CLAMP

CROSS-REFERENCE TO RELATED APPLICATION

This application is a 371 of international application of PCT application serial no. PCT/CN2018/071841, filed on Jan. 9, 2018, which claims the priority benefit of China application no. 201710100340.5, filed on Feb. 23, 2017. The entirety of each of the above mentioned patent applications is hereby incorporated by reference herein and made a part of this specification.

BACKGROUND

Technical Field

The disclosure relates to the field of cable installation, in particular to an integrated opposite hook wire clamp.

Description of Related Art

When erecting cables, the cable is typically straightened by means of cable fixing tool. As shown in FIG. 1, the conventional cable fixing tool consists of a cable fixing bracket 1 that can be mounted on a wall or bar and an insulator 12 for supporting the cable. When the cable passes through the cable fixing tool, the cable is generally attached closely to the insulator 12, and then the cable and the insulator 12 are bundled and fixed by a wire through winding. This method is inefficient; besides, there is no standard set for the binding method and the binding tightness and thus the method is performed randomly, which easily leads to looseness of wire. The wire will loosen or even fall off after being used for a long time. The wire is usually made of metal wire such as aluminum wire, which is directly wound around the sheath of cable, which may cause damage to the sheath of cable, and further cause hazard such as cable overheating or even leakage and short circuit. Moreover, the insulated cable in direct contact with the metal wire might cause leakage.

Although improvement has been made for the conventional cable fixing method, and various fixing mechanisms have been adopted to fix the cable, basically the entire conventional cable fixing tool needs to be replaced. Currently, most of the low-voltage cables are configured by using the conventional cable fixing tool described above, replacing all conventional cable fixing tools will cause great waste and high cost, so the method is difficult to promote and the utility is not high. Besides, most of the fixing-wire mechanisms have shortcomings such as complicated structures, not easy to be installed and disassembled, high manufacturing and maintenance costs, and inflexible cable layout. In particular, when the cable needs to be bent and turned on the cable fixing tool, the cable is not fixed firmly, which brings great inconvenience to the arrangement and maintenance of the cable.

SUMMARY

The task of the present disclosure is to provide an integrated opposite hook wire clamp, which can fix the cable on the conventional cable fixing tool, thereby replacing the method of winding and binding the cable with the wire, and the operation is simple and less likely to cause damage to the sheath of the cable while retaining the cable fixing bracket and insulator in the conventional cable fixing tool. The method has a wide application range, and can clamp the cable firmly so the cable does not easily fall off. The cable layout is flexible, and the cable can be firmly fixed to the cable fixing tool no matter passing through the cable fixing tool straightly or in a bent way.

The disclosure is realized by the following technical solutions:

An integrated opposite hook wire clamp includes a clamping plate, a connecting plate, and at least two J-shaped clamps. Side bars of the J-shaped clamps are locking bars. Locking holes corresponding to the locking bars are provided on the clamping plate, and at least two of the locking holes are diagonally arranged on the clamping plate. The locking bars of the J-shaped clamps respectively and vertically pass through the locking holes on the clamping plate and are movably connected with the clamping plate by a locking mechanism. A back surface of the connecting plate is lap-jointed to an inner side of a hook of each of the J-shaped clamps. A front surface of the connecting plate is opposite to a front surface of the clamping plate.

Preferably, the back surface of the connecting plate is provided with position-limiting slots corresponding to the J-shaped clamps, and the inner side of the hook of each of the J-shaped clamps engages in a corresponding one of the position-limiting slots.

Preferably, each of the position-limiting slots is provided with a fixing hole, and the inner side of the hook of each of the J-shaped clamps is provided with a fixing pin corresponding to the fixing hole, and the fixing pin is inserted into the fixing hole in an interference fit manner.

Preferably, the front surface of the connecting plate and/or the front surface of the clamping plate is a concave arc-shaped structure.

Preferably, the integrated opposite hook wire clamp further includes a pressure bearing block, and a side of the pressure bearing block is provided with a latch. The front surface of the connecting plate and/or the front surface of the clamping plate are provided with an insertion hole, and the latch is inserted into the insertion hole in an interference fit manner.

Preferably, the front surface of the connecting plate and/or the front surface of the clamping plate are further provided with at least one anti-slip protrusion or anti-slip stripe.

Preferably, the locking mechanism is a threaded connection mechanism, and the threaded connection mechanism is: the locking bar is provided with an external thread and a corresponding nut.

Preferably, the locking mechanism is an anti-reverse self-locking mechanism, and the anti-reverse self-locking mechanism is configured in the manner that: each of the locking bars is provided with a plurality of consecutively arranged anti-reverse ring teeth that are inclined toward a root of a corresponding one of the locking bars, and a lateral side of each of the locking holes is provided with an opening, and the opening has a movable locking block disposed therein. A side of the locking block adjacent to the corresponding one of the locking bars is provided with at least one locking tooth that is inclined toward an outlet of a corresponding one of the locking holes, and a side of the locking block facing away from the corresponding one of the locking bars abuts against a locking spring.

Preferably, a side of the locking block adjacent to each of the locking bars is provided with an arc slot matching a corresponding one of the locking bars, and the locking tooth is an arc-shaped tooth disposed on the arc slot.

Preferably, the back surface of the clamping plate is respectively provided with a locking slot corresponding to each of the locking holes, and an entrance of the locking slot is provided with a cover plate. The corresponding locking block and the locking spring are placed in the locking slot, and one end of the locking spring abuts against the locking block, and the other end abuts against a side wall of the locking slot. The locking block moves through a guidance of the cover plate and a bottom portion of the locking slot.

Preferably, two locking springs are disposed in each of the locking slots, and two locking springs are respectively disposed on opposite sides of a back surface of the corresponding locking block.

Preferably, a pin for connecting the cover plate and the bottom portion of the locking slot is disposed between the two locking springs, and a recess corresponding to the pin is disposed on the corresponding locking block.

Preferably, the integrated opposite hook wire clamp includes an inner frame made of a metal material and an outer frame made of plastic or a rubber material.

Preferably, the back surface of the clamping plate is further provided with a protective cover for protecting the locking bars.

Preferably, the lateral side of the protective cover is provided with at least two hanging buckles, and a lateral side of the clamping plate is provided with a hook corresponding to the hanging buckle, and the detachable connection between the protective cover and the clamping plate can be realized through the cooperation of the hook sand the hanging buckles.

The integrated opposite hook wire clamp of the present disclosure has the advantageous effects. 1. The J-shaped clamp has a simple structure, is easy to install and flexible, and is convenient for fixing the cable on the insulator on the basis of retaining the conventional cable fixing tool with the cable fixing bracket and the insulator, thereby replacing the method of binding the cable by winding a wire around the cable. The sheath of the cable is not liable to damage, and the cable can be firmly fixed and is not liable to fall off; 2. A connecting plate is adopted to connect the J-shaped clamps together, which not only retains the advantage of the J-shaped clamps for easy and flexible installation while achieving the advantage of firmly clamping the cable. The cable can be firmly fixed to the cable fixing tool no matter passing through the cable fixing tool straightly or in a bent way. Moreover, the connecting plate or the clamping plate can clamp the cable with the insulator, and the cable arrangement is flexible; 3. An anti-reverse self-locking mechanism is formed through the anti-reverse ring teeth on the locking bar of the J-shaped clamp and the locking teeth on the locking block in the locking hole of the clamping plate along with cooperation of the locking spring, so that the J-shaped clamp can only move forward and cannot retreat in the clamping plate. In operation, the J-shaped clamp is automatically locked and is not easy to loose after being directly inserted into the clamping plate. When it needs to be opened, the J-shaped clamp can be freely moved out from the clamping plate by simply pressing the locking spring to retract the blocking block. The operation is extremely convenient and easy to use, especially suitable for wiring construction at high altitude.

The concept, the specific structure and the effects of the present disclosure will be further described with reference to the accompanying drawings to fully elaborate the purpose, features and effects of the present disclosure.

DESCRIPTION OF THE EMBODIMENTS

Figure 1:
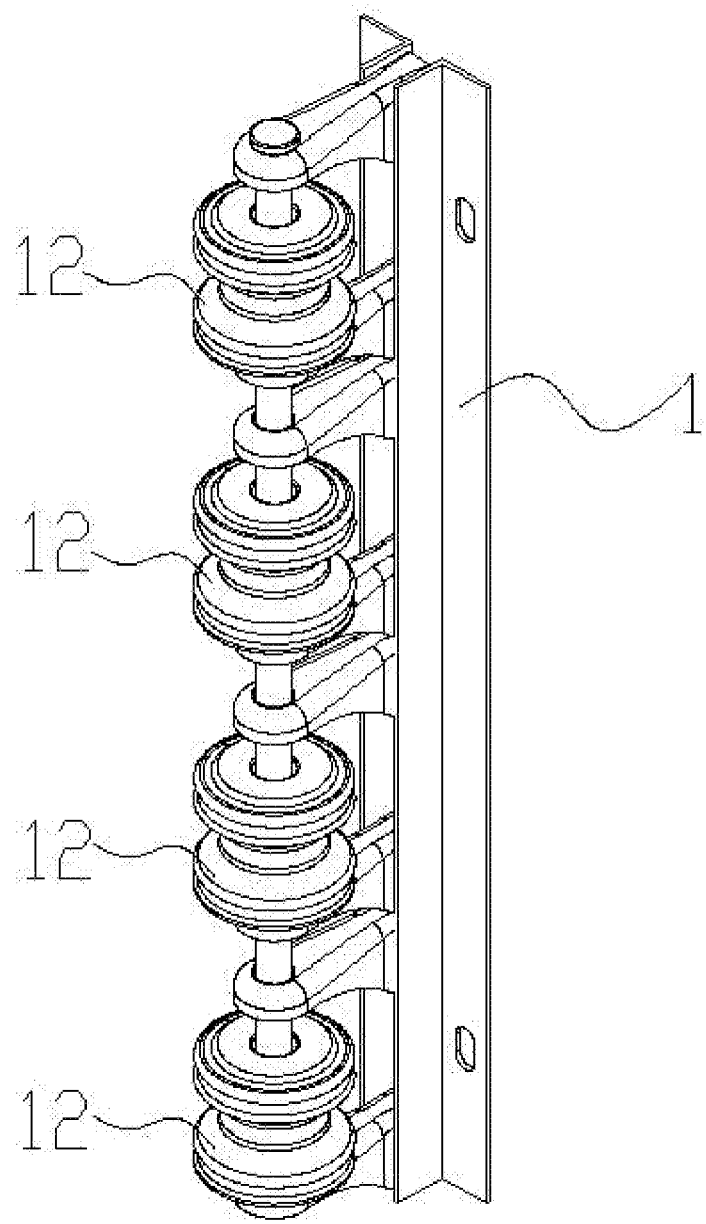
FIG. 1 is a schematic diagram of a structure of a conventional cable fixing tool.

In order to make the purpose, technical solutions and advantageous effect of the present disclosure more clear, the disclosure is further described in detail below with reference to accompanying drawings and embodiments. It should be understood that the specific embodiments described herein are merely illustrative of the disclosure and are not intended to limit the disclosure.

It should be noted that the terms "front surface", "back surface", "front", "back" and the like are used herein to explain the disclosure and are not intended to limit the disclosure.

Embodiment 1

As shown in FIG. 1 to FIG. 7, an integrated opposite hook wire clamp includes a clamping plate 22, a connecting plate 23 and two J-shaped clamps 21. Side bars of the J-shaped clamps 21 are locking bars 212. The clamping plate 22 is provided with locking holes 222 corresponding to the locking bars 212, and the two locking holes 222 are diagonally disposed on the clamping plate 22. The locking bars 212 of the J-shaped clamps 21 vertically pass through the locking holes 222 on the clamping plate 22, respectively, and are movably connected to the clamping plate 22 by a locking mechanism. A back surface of the connecting plate 23 is lap-jointed to an inner side of a hook 211 of each of the two J-shaped clamps 21, and a front surface of the connecting plate 23 is opposite to a front surface of the clamping plate 22. The locking mechanism adopts a threaded connection mechanism, and each of the locking bars 212 is provided with an external thread and a corresponding nut. The locking bars 212 can be adjusted to move relative to the locking holes 222 through rotating the nut.

In operation, an integrated opposite hook wire clamp of the present disclosure is mounted on a conventional cable fixing tool, and the clamping plate 22 and the connecting plate 23 are respectively disposed on both sides of the insulator 12. One side of the insulator 12 abuts against the front surface of the clamping plate 22 or the front surface of the connecting plate 23, and the other side of the insulator 12 along with the locking bars 212 of the two J-shaped clamps 21 cooperate with the front surface of the connecting plate 23 or the front surface of the clamping plate 22 to form a wire-passing passage 3 for a cable to pass therethrough. The cable passes through the wire-passing passage 3, and then the two J-shaped clamps 21 are locked, such that the connecting plate 23 or the clamping plate 22 cooperates with the insulator 12 to clamp the cable firmly, thereby replacing the method of binding the cable by winding a wire around the cable. In this manner, a sheath of the cable is not liable to damage, and the cable can be firmly fixed and is not liable to fall off. The J-shaped clamps 21 are connected together by the connecting plate 23, which retains the advantage of the J-shaped clamps 21 for easy and flexible installation while achieving the advantage of firmly clamping the cable. The cable can be firmly fixed to the cable fixing tool no matter passing through the cable fixing tool straightly or in a bent way. Moreover, the connecting plate 23 or the clamping plate 22 can clamp the cable with the insulator 12, and the cable arrangement is flexible.

Figure 5:
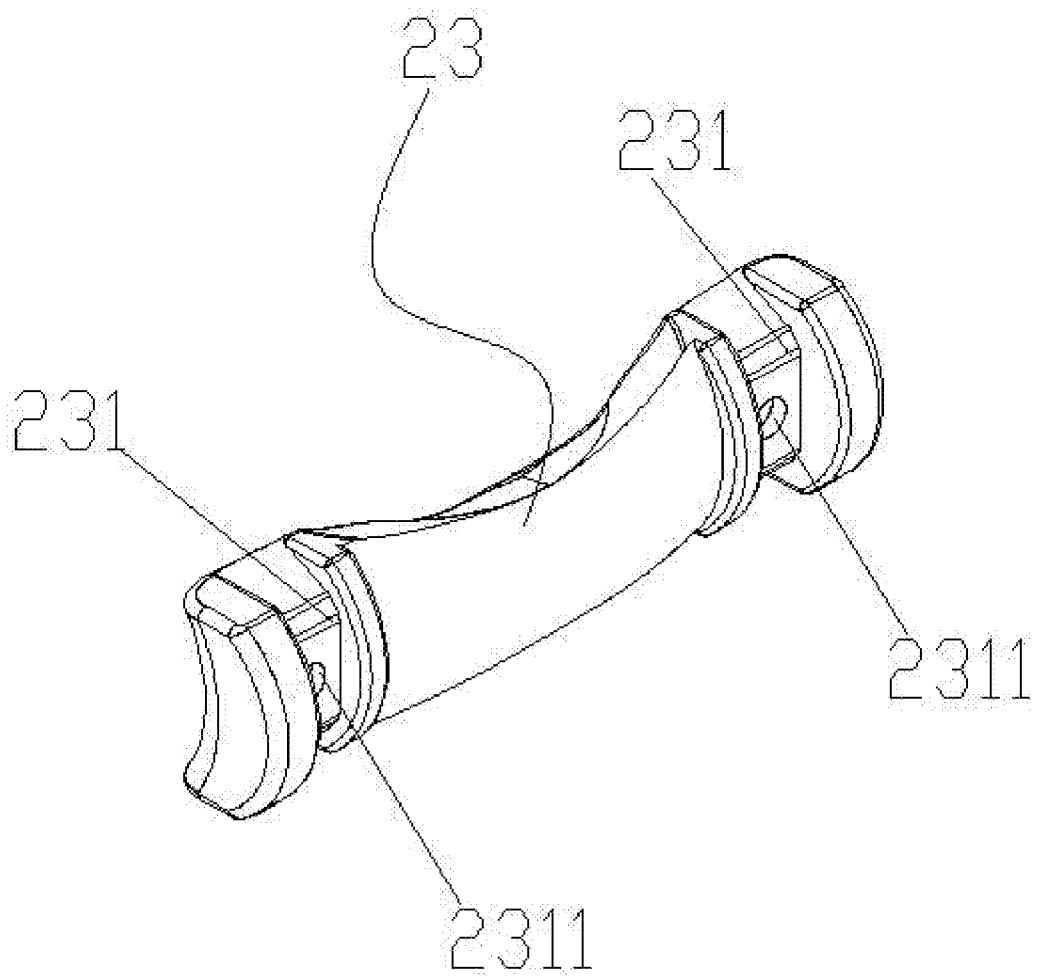
FIG. 5 is a schematic diagram of a structure of a connecting plate of FIG. 2.

As a preferred embodiment, as shown in FIG. 5, the back surface of the connecting plate 23 is provided with position-limiting slots 231 corresponding to the J-shaped clamps 21, and the inner side of the hook 211 of each of the J-shaped clamp 21 engages in a corresponding one of the position-limiting slots 231, which can prevent the J-shaped clamps 21 from slipping off the connecting plate 23.

As a preferred embodiment, as shown in FIG. 5, each of the position-limiting slots 231 is provided with a fixing hole 2311. The inner side of the hook 211 of each of the J-shaped clamps 21 is provided with a fixing pin 2111 corresponding to the fixing hole 2311, and the fixing pin 2111 is inserted into the fixing hole 2311 in an interference manner. The J-shaped clamps 21 and the connecting plate 23 can be fixed together through interference fitting, thereby preventing the connecting plate 23 from falling off, and facilitating assembling and disassembling in a limited space on a cable fixing bracket 1.

Figure 3:
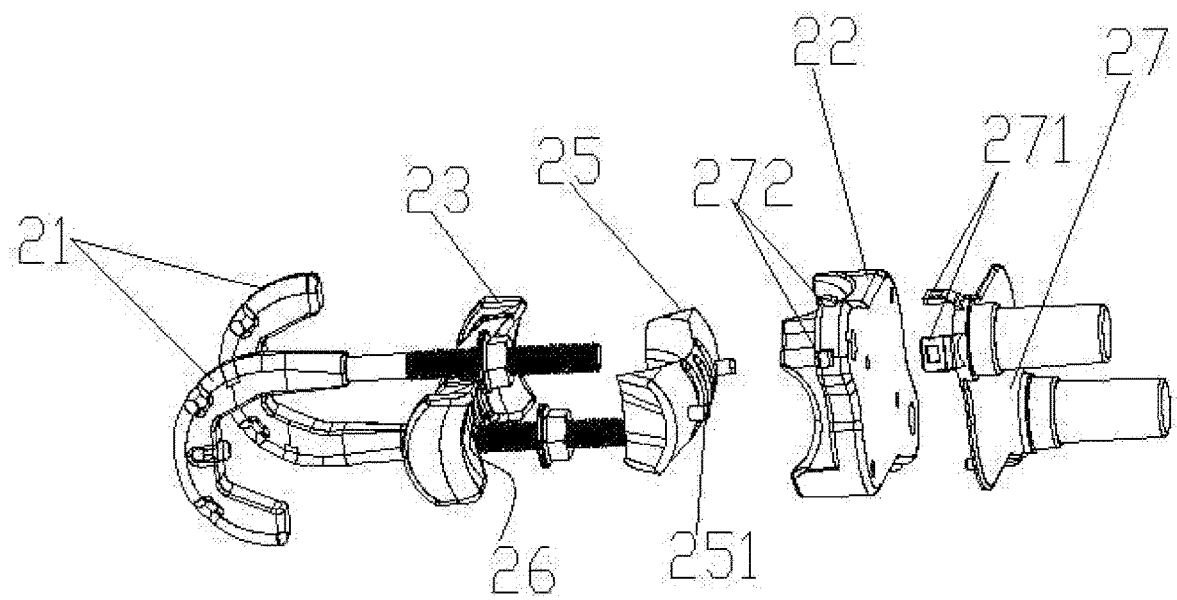
FIG. 3 is a schematic diagram of an exploded structure of FIG. 2.
Figure 4:
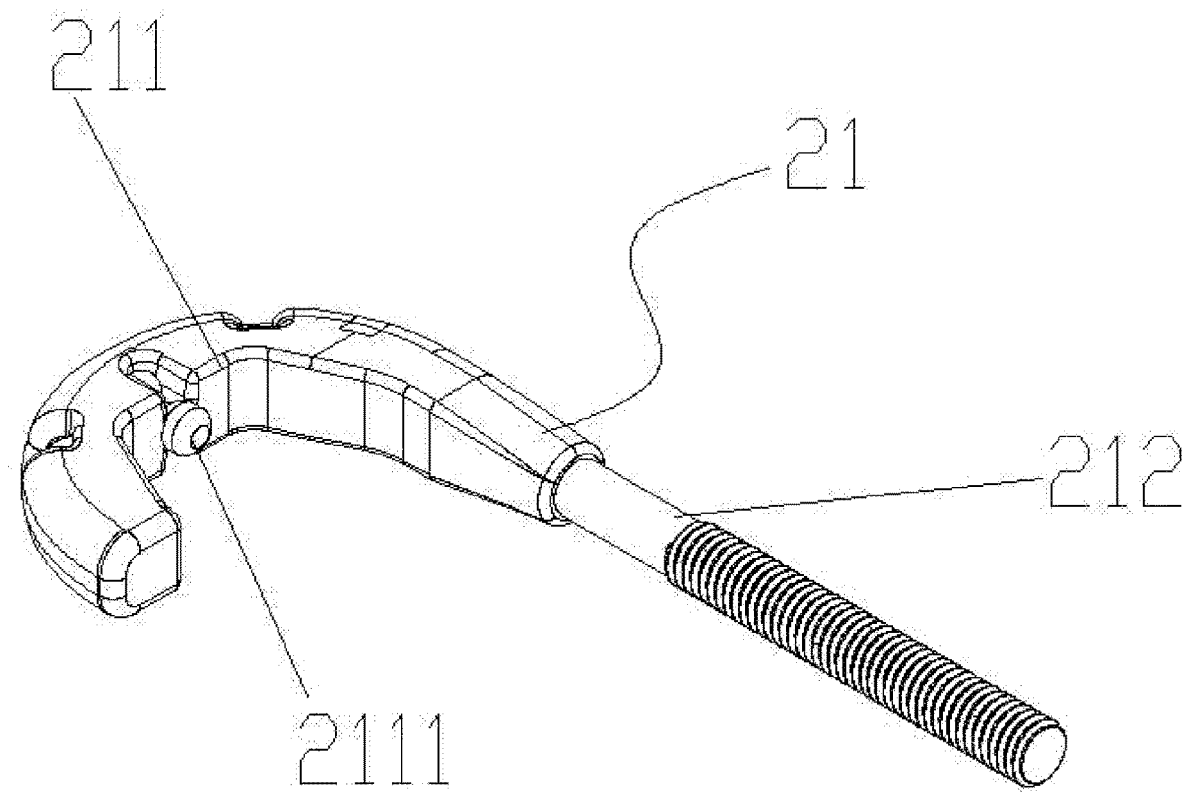
FIG. 4 is a schematic diagram of a structure of a J-shaped clamp of FIG. 2.
Figure 6:
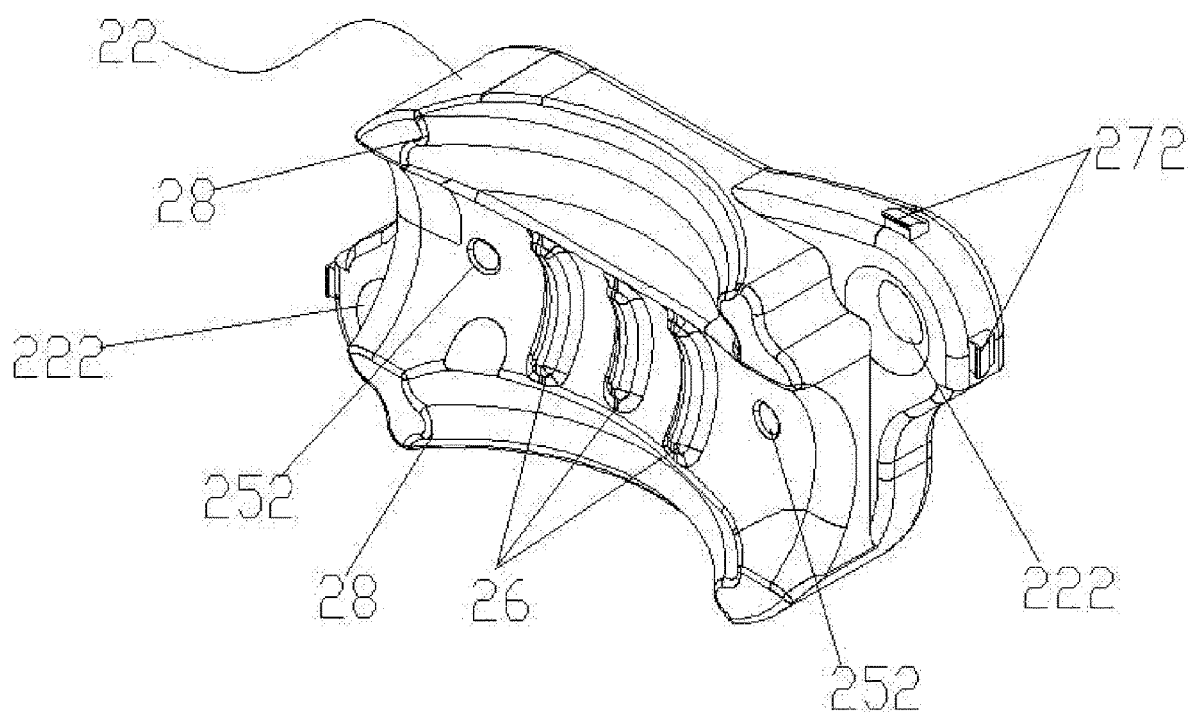
FIG. 6 is a schematic diagram of a structure of the clamping plate of FIG. 2.
Figure 7:
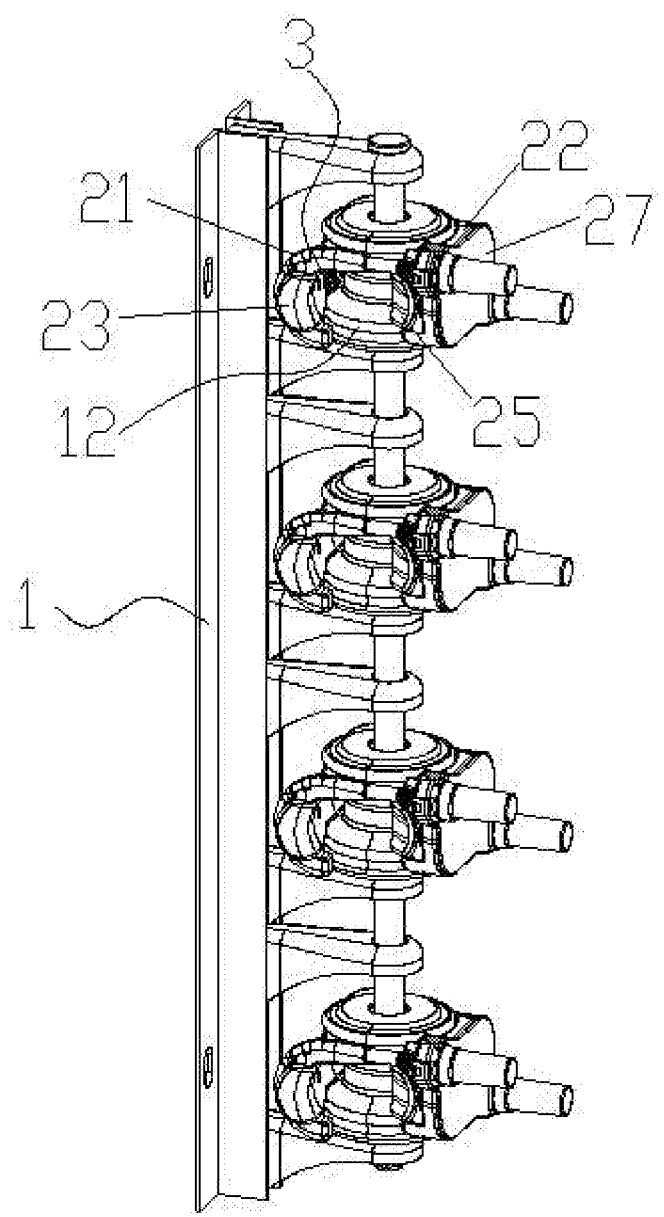
FIG. 7 is a reference diagram showing a state of use of an integrated opposite hook wire clamp in Embodiment 1 of the present disclosure.

As a preferred embodiment, as shown in FIG. 3, FIG. 5, and FIG. 6, the front surface of the connecting plate 23 and the front surface of the clamping plate 22 are both concave arc-shaped structures, which can securely fix the cable more firmly to a position close to a center of the front surface of the connecting plate 23 or the clamping plate 22, and the cable can be securely fastened.

As a preferred embodiment, as shown in FIG. 3, the integrated opposite hook wire clamp further includes a pressure bearing block 25, and one side of the pressure bearing block 25 is provided with a latch 251, and the front surface of the connecting plate 23 and the front surface of the clamping plate 22 are provided with an insertion hole 252. The latch 251 is inserted into the insertion hole 252 in an interference fit manner to facilitate the fixing of the pressure bearing block 25 and to prevent the pressure bearing block 25 from slipping off or sliding off. One side of the pressure bearing block 25 abuts against the front surface of the connecting plate 23 or the front surface of the clamping plate 22, and the other side of the pressure bearing block 25 abuts against the insulator 12. When one of the connecting plate 23 and the clamping plate 22 is used to clamp the cable with the insulator 12, the pressure bearing block 25 is disposed between the other one of the connecting plate 23 and the clamping plate 22 and the insulator 12, thereby increasing the pressure bearing area and increasing the pressure withstand of the connecting plate 23 or the clamping plate 22 to prevent the connecting plate 23 or the clamping plate 22 from being damaged by deformation.

As a preferred embodiment, as shown in FIG. 3 and FIG. 6, the front surface of the connecting plate 23 and the front surface of the clamping plate 22 are further provided with at least one anti-slip protrusion or anti-slip stripe 26, which increases the friction between the cable and the connecting plate 23 or the clamping plate 22, thereby increasing the firmness in securing the cable.

As a preferred embodiment, as shown in FIG. 2 to FIG. 6, a material of the integrated opposite hook wire clamp includes an inner frame made of a metal material and an outer frame made of plastic or a rubber material. The metal inner frame can increase the robustness, an outer layer of the plastic or rubber makes processing and shaping easier, and the contact area with the cable is increased. As compared with the method of binding the cable with wire, the configuration of insulation is made coherently, and the cable does not contact the metal bracket, so the safety is guaranteed, and wear and scratch on the sheath of cable can be significantly reduced.

Figure 2:
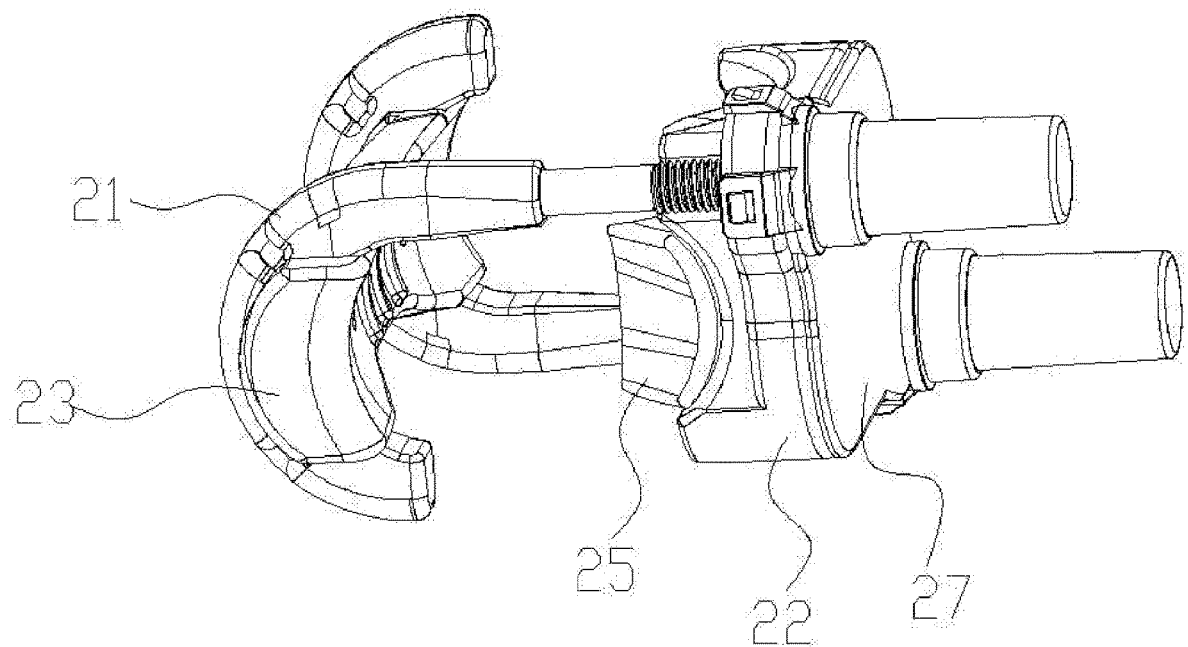
FIG. 2 is a schematic diagram of a structure of an integrated opposite hook wire clamp according to Embodiment 1 of the present disclosure.

As a preferred embodiment, as shown in FIG. 2 and FIG. 3, the back surface of the clamping plate 22 is further provided with a protective cover 27 for protecting the locking bars 212.

As a preferred embodiment, as shown in FIG. 2 and FIG. 3, at least two hanging buckles 271 are disposed on a lateral side of the protective cover 27, and hooks 272 corresponding to the hanging buckles 271 are disposed on a lateral side of the clamping plate 22. The cooperation between the hooks 272 and the hanging buckles 271 can realize detachable connection of the protective cover 27 and the clamping plate 22.

Embodiment 2

On basis of the technical solution of the Embodiment 1, the locking mechanism of the integrated opposite hook wire clamp adopts an anti-reverse self-locking mechanism.

Figure 8:
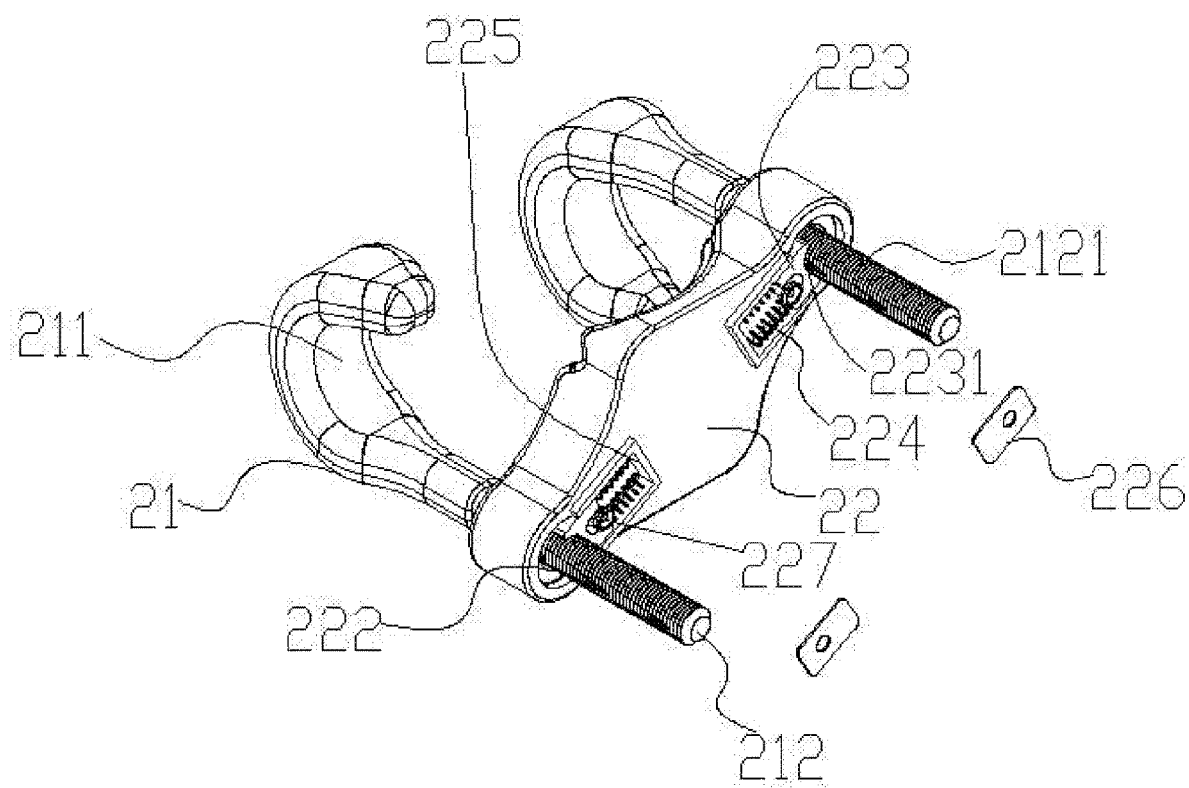
FIG. 8 is a schematic exploded structural view showing an integrated opposite hook wire clamp according to Embodiment 2 of the present disclosure.

As shown in FIG. 8, the anti-reverse self-locking mechanism is configured in the manner that: each of the locking bars 212 is provided with a plurality of consecutively arranged anti-reverse ring teeth 2121 that are inclined toward a root of a corresponding one of the locking bars 212. A lateral side of each of the locking holes 222 is provided with an opening, and the opening has a movable locking block 223 disposed therein. A front end of the locking block 223 is provided with a plurality of locking teeth 2231 inclined toward an outlet of the locking hole 222 and can cooperate with the anti-reverse ring teeth 2121. The back surface of the locking block 223 abuts against the locking springs 224. When the locking bars 212 are inserted from inlets of the locking holes 222, the locking springs 224 push the locking block 223 such that the locking teeth 2231 of the locking block 223 abuts against the anti-reverse ring teeth 2121 of the locking bars 212 to limit the locking bars 212; in this manner, the locking bars 212 can only move forward can cannot move reversely, wherein the connecting plate is not shown in the figure. The anti-reverse self-locking mechanism is formed through the anti-reverse ring teeth 2121 on the locking bar 212 of each of the J-shaped clamps 21 and the locking teeth 2231 on the locking block 223 in each of the locking holes 222 of the clamping plate 22 along with cooperation of the locking spring 224, so that the J-shaped clamps 21 can only move forward and cannot retreat in the clamping plate 22. In operation, the J-shaped clamps 21 are automatically locked and is not easy to loose after being directly inserted into the clamping plate 22. When it needs to be opened, the J-shaped clamps 21 can be freely moved out from the clamping plate 22 by simply pressing the locking springs 224 to retract the blocking block 223. The operation is extremely convenient and easy to use, especially suitable for wiring construction at high altitude.

As a preferred embodiment, as shown in FIG. 8, the front end of the locking block 223 is provided with an arc-shaped slot that cooperates with each of the locking bars 212. The locking teeth 2231 are arc-shaped teeth disposed on the arc-shaped slot. The arc-shaped slot and the arc-shaped tooth structure can enhance the locking force of the locking block 223 on the locking bar 212.

As a preferred embodiment, as shown in FIG. 8, the back surface of the clamping plate 22 is respectively provided with a locking slot 225 corresponding to each locking hole 222, and an entrance of the locking slot 225 is provided with a cover plate 226, the corresponding locking block 223 and the locking spring 224 are placed in the locking slot 225. One end of the locking spring 224 abuts against the locking block 223, and the other end abuts against the side wall of the locking slot 225. The locking block 223 moves through a guidance of the cover plate 226 and the bottom portion of the locking slot 225, which facilitates the locking block 223 to move stably in the locking slot 225 to prevent the locking block 223 from slipping off.

As a preferred embodiment, as shown in FIG. 8, two locking springs 224 are disposed in each of the locking slots 225, and two locking springs 224 are respectively disposed on two sides corresponding to the back surface of the locking block 223. The two locking springs 224 are arranged reasonably, so that the spring thrust applied to the locking block 223 is more balanced and the thrust is greater.

As a preferred embodiment, as shown in FIG. 8, a pin 227 for connecting the cover plate 226 and the bottom portion of the locking slot 225 is disposed between the two locking springs 224, and a recess corresponding to the pin 227 is disposed on the corresponding locking block 223, thereby increasing the moving space of the locking block 223 in the limited space of the locking slot 225.

Preferred embodiments of the present disclosure are shown in the accompanying drawings. However, the disclosure may be realized in many different forms and is not limited to the embodiments described in this specification. Rather, these embodiments are provided for the purpose of making the elaboration of present disclosure more thorough and comprehensive.

What is claimed is:

1. An integrated opposite hook wire clamp, comprising: a clamping plate, a connecting plate and at least two J-shaped clamps, wherein a side bar of each of the J-shaped clamps is a locking bar, the clamping plate is provided with a plurality of locking holes corresponding to the locking bars and the at least two of the locking holes are diagonally disposed on the clamping plate, and the locking bars of the J-shaped clamps respectively and vertically pass through the locking holes of the clamping plate and are movably connected to the clamping plate by a locking mechanism, a back surface of the connecting plate is lap-jointed on an inner side of a hook of each of the J-shaped clamps, and a front surface of the connecting plate is opposite to a front surface of the clamping plate.

2. The integrated opposite hook wire clamp according to claim 1, wherein the back surface of the connecting plate is provided with position-limiting slots corresponding to the J-shaped clamps, and the inner side of the hook of each of the J-shaped clamps engages in a corresponding one of the position-limiting slots.

3. The integrated opposite hook wire clamp according to claim 2, wherein each of the position-limiting slots is provided with a fixing hole, and the inner side of the hook of each of the J-shaped clamps is provided with a fixing pin corresponding to the fixing hole, the fixing pin is inserted into the fixing hole in an interference fit manner.

4. The integrated opposite hook wire clamp according to claim 1, wherein the front surface of the connecting plate and/or the front surface of the clamping plate is a concave arc-shaped structure.

5. The integrated opposite hook wire clamp according to claim 1, wherein the integrated opposite hook wire clamp further comprises a pressure bearing block, and a side of the pressure bearing block is provided with a latch, an insertion hole is provided on the front surface of the connecting plate and/or the front surface of the clamping plate, and the latch is inserted into the insertion hole in an interference fit manner.

6. The integrated opposite hook wire clamp according to claim 1, wherein the front surface of the connecting plate and/or the front surface of the clamping plate is further provided with at least one anti-slip protrusion or anti-slip stripe.

7. The integrated opposite hook wire clamp according to claim 1, wherein the locking mechanism is a threaded connection mechanism, and the threaded connection mechanism is that each of the locking bars is provided with an external thread and a corresponding nut.

8. The integrated opposite hook wire clamp according to claim 1, wherein the locking mechanism is an anti-reverse self-locking mechanism, and the structure of the anti-reverse self-locking mechanism is that each of the locking bars is provided with a plurality of consecutively arranged anti-reverse ring teeth that are inclined toward a root of a corresponding one of the locking bars, a lateral side of each of the locking holes is provided with an opening, and the opening has a movable locking block disposed therein, a side of the locking block adjacent to the corresponding one of the locking bars is provided with at least one locking tooth that is inclined toward an outlet of a corresponding one of the locking holes, and a side of the locking block facing away from the corresponding one of the locking bars abuts against a locking spring.

9. The integrated opposite hook wire clamp according to claim 8, wherein a side of the locking block adjacent to the corresponding one of the locking bars is provided with an arc-shaped slot matching the corresponding one of the locking bars, the locking tooth is arc-shaped tooth disposed on the arc-shaped slot.

10. The integrated opposite hook wire clamp according to claim 9, wherein a back surface of the clamping plate is provided with locking slots, each of which corresponds to the locking holes and has an entrance provided with a cover plate, the corresponding locking block and the locking spring are placed in the locking slot, one end of the locking spring abuts against the locking block, and the other end abuts against a side wall of the locking slot, the locking block moves through a guidance of the cover plate and a bottom portion of the locking slot.

11. The integrated opposite hook wire clamp according to claim 10, wherein two of the locking springs are disposed in each of the locking slots, and the two locking springs are respectively disposed on opposite sides of a back surface of the corresponding locking block.

12. The integrated opposite hook wire clamp according to claim 11, wherein a pin for connecting the cover plate and the bottom portion of the locking slot is disposed between the two locking springs, and a recess corresponding to the pin is disposed on the corresponding locking block.

13. The integrated opposite hook wire clamp according to claim 1, wherein the integrated opposite hook wire clamp comprises an inner frame made of a metal material and an outer frame made of plastic or a rubber material.

14. The integrated opposite hook wire clamp according to claim 1, wherein a back surface of the clamping plate is further provided with a protective cover for protecting the locking bars.

15. The integrated opposite hook wire clamp according to claim 14, wherein a lateral side of the protective cover is provided with at least two hanging buckles, and a lateral side of the clamping plate is provided with hooks corresponding to the hanging buckles, and detachable connection between the protective cover and the clamping plate is realized through cooperation of the hooks and the hanging buckles.

* * * * *